Feb. 2, 1960 M. J. RAFFENSPERGER 2,923,850

SWEEP CIRCUIT

Filed March 27, 1956

*INVENTOR.*

MAURICE J. RAFFENSPERGER

BY Joseph J. Connerton

ATTORNEY

United States Patent Office 2,923,850

Patented Feb. 2, 1960

2,923,850

SWEEP CIRCUIT

Maurice J. Raffensperger, Redondo Beach, Calif., assignor to International Business Machines Corporation, New York, N.Y., a corporation of New York Application March 27, 1956, Serial No. 574,235

7 Claims. (Cl. 315—27)

The present invention relates to electronic circuits and more particularly to a sweep circuit for producing sawtooth voltage waveforms. Such waveforms are utilized, for example, in causing an electron beam to scan a phosphor screen to provide a radial sweep in a cathode ray tube.

A primary object of the present invention is to provide an improved sweep circuit.

Another object of the present invention is to provide an improved sweep circuit adapted to cooperate with a rotating coil deflection system to provide a polar display on a cathode ray tube.

Another object of the present invention is to provide an improved sweep circuit comprising a thyratron sawtooth generator coupled through a cathode follower stage to a deflection amplifier stage.

Still another object of the present invention is to provide an improved sweep circuit including a thyratron sawtooth generator.

Another object of the present invention is to provide an improved sweep circuit having a rapid flyback with respect to the duration of the sweep signal.

Still another object of the present invention is to provide a relatively simple sweep circuit wherein the input pulse is utilized to initiate the sweep as well as to control flyback.

A further object of the present invention is to provide an improved sweep circuit wherein the reference potential from which the sweep starts is accurately maintained despite relatively wide variation in circuit parameters.

Another object of the present invention is to provide an improved thyratron sweep circuit wherein the nonlinearity of the sweep signal resulting from the variation in the anode cathode drop of the thyratron circuit is substantially compensated for.

Still another object of the present invention is to provide an improved D.C. sweep generator having a high degree of stability at any frequency within a relatively wide frequency range.

A further object of the present invention is to provide an improved sweep circuit wherein the characteristics of the output amplifier stage are utilized to compensate for the non-linear charging of the capacitor in the sawtooth generator stage.

Other objects of the invention will be pointed out in the following description and claims and illustrated in the accompanying drawings, which disclose, by way of example, the principles of the invention and the best mode, which has been contemplated, of applying those principles.

Generally speaking, there are two methods for obtaining deflection of the beam in a cathode ray tube, magnetic deflection and electric deflection. In the former, magnetic fields focus and deflect the CRT beam. Magnetic deflection possesses several advantages over electric deflection, particularly applicable to cathode ray tubes of large size. One advantage is that the length of the stem of the tube is smaller than the corresponding length in an electric deflection system, permitting a more compact tube structure. A second advantage is that the higher deflection force necessary for large cathode ray tubes can be obtained by merely increasing the ampere turns in the deflection coil. Thus magnetic deflection in large tubes often leads to economy of weight, bulk and cost.

One well known application of radial sweep circuits is to provide a radar display on a plan position indicator, or P.P.I. In such a display, if the ground range and azimuth angle of each target are represented respectively by the distance from a fixed origin and by the azimuth angle on the cathode ray tube face, the result is a map with the radar site as the origin. Thus in such a display the various targets appear in the proper direction as well as at the proper relative distance from this origin.

The present apparatus is directed toward a radial sweep circuit adapted to generate a sawtooth current wave used to drive the deflection coil of a magnetically deflected cathode ray tube.

Figures 2, 3A, 3B:
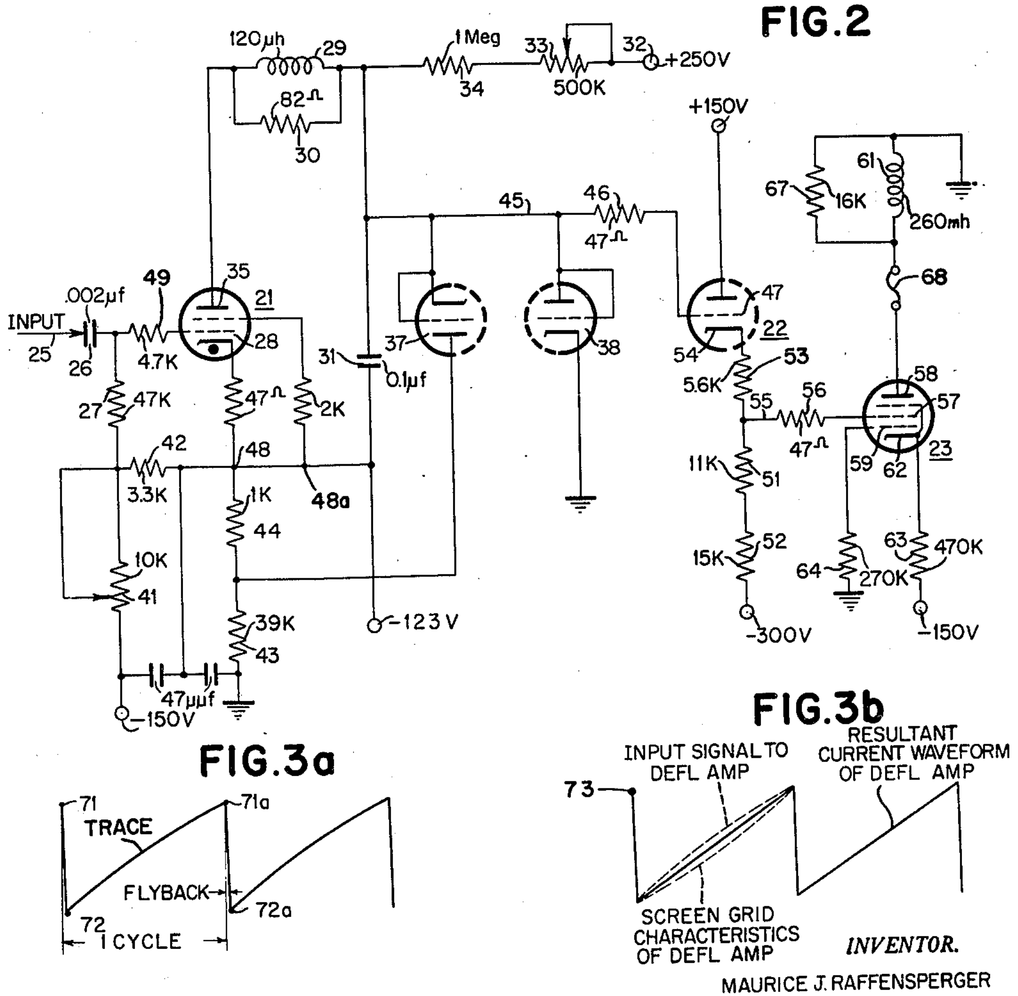
Fig. 2 illustrates in schematic form the present invention shown in block form in Fig. 1.

Figs. 3*a* and 3*b* illustrate the sawtooth waveform output of the thyratron generator and deflection amplifier respectively.

In electronic sweep circuits, a primary consideration is the shape of the sweep voltage waveform. For most applications, this sweep voltage waveform must have a substantially linear voltage vs. time characteristic, that is, a single straight line quality, known as a sawtooth waveform, so that the spot travels across the screen of the cathode ray tube at a constant speed. In an ideal sawtooth signal, the diagonal lines indicate the rising voltage characteristic which sweeps the beam across the screen, while the perpendicular lines indicate the retrace of the beam from its final position at one end of the cathode ray tube screen back to its starting position. The time required to obtain this rising waveform is known as the trace time, while the time required to retrace is known as the "flyback" time. In order for the sawtooth to be useful as a sweep, only a small portion of each sawtooth cycle may be allotted to the flyback time. If the flyback time occupies a considerable portion of a sawtooth cycle, the complete waveform under observation will not be reproduced. In an idealized sawtooth waveform, therefore, the flyback time is zero. The present apparatus is designed to provide a substantially linear sawtooth signal having a short flyback time while utilizing a minimum of equipment.

Figure 1:
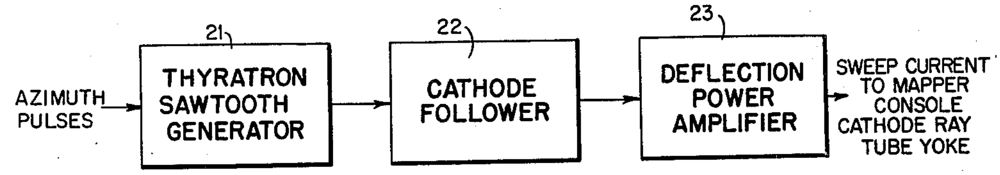
Fig. 1 illustrates in block form a preferred embodiment of the present invention.

Referring to the drawings and more particularly to Fig. 1 thereof, there is illustrated in block form the preferred embodiment of the present invention. Basically, the present apparatus comprises a thyratron sawtooth generator stage 21, a cathode follower stage 22 and a deflection amplifier stage 23. The resulting sawtooth output of the deflection amplifier stage is applied to the deflection yoke of the cathode ray tube to obtain a radial sweep.

With respect to signal specifications, the input signals to the sweep circuit used to initiate the generation of each sawtooth waveform should recur at substantially constant intervals and be of sufficient amplitude to fire the thyratron generator stage. For example, the input signal may be a 5 microsecond positive step function having a magnitude of from 20 to 40 volts. In a particular application, satisfactory operation was obtained with any substantially constant frequency within a pulse repetition rate range between 8.5 and 42.7 pulses per second. The output signal from the sweep circuit is a sawtooth current waveform which rises linearly with time and falls at a rapid rate at the end of the sweep. The duration of the sweep signal may vary between 117 and 23.4 milliseconds at pulse repetition rates between 8.53 and 42.7 pulses per second while the corresponding flyback time will not exceed 75 microseconds. In the ensuing description, the overall circuit operation will be described with reference to the schematic drawing shown in Fig. 2.

Referring now to Fig. 2, when a positive signal such as the above defined 5 microsecond pulse is applied to input conductor 25, an RC coupling network comprising capacitor 26 and resistor 27 transmits a pulse to control grid 28 of thyratron 21. When this signal is applied to control grid 28, thyratron 21 fires, thereby producing ionization in the thyratron. Thyratron 21 is employed as the sweep oscillator in which the control grid 28 provides a certain degree of control over the ionization potential of the tube. With the grid bias at a certain potential, the potential on the thyratron anode must reach a certain value, called the "striking potential," before the gas in the tube will ionize. Once the gas ionizes and the tube starts conducting, the grid loses control.

A thyratron is particularly suited to the generation of a high duty ratio sawtooth wave. Such a gas filled tube operates as a switch which conducts when the grid voltage and the potential between the anode and cathode allow a critical level called the "striking potential" to be reached. At this point a gaseous discharge starts in the tube and continues until the current through the tube is reduced below a critical level that quenches the discharge. During the discharge the internal impedance of the tube is very low, and any capacity across the tube can be rapidly discharged.

In the preferred embodiment herein described, a tetrode type thyratron is employed in which the control grid is pulsed positive to start conduction in the tube. If the high duty ratios of which such thyratrons are capable are to be realized, the associated sawtooth generator must be one that has a short recovery time. The manner in which this is provided is described in detail hereinafter.

Capacitor 31, connected between the cathode and anode of thyratron 21, has a charging circuit from positive 250 volt source 32 through rheostat 33 and resistor 34. When thyratron 21 conducts, it acts as a virtual short circuit across the capacitor, and the potential at anode 35 drops rapidly to approximately −115 volts. At the moment of ionization, capacitor 31 starts discharging through the thyratron and continues to discharge until the potential across the thyratron reaches a particular level at which the gas in the tube deionizes. The voltage across capacitor 31 drops rapidly when thyratron 21 is fired, but diminishes at a slower rate than the thyratron because of the action of inductance 29 and resistor 30 in the thyratron anode circuit and resistor 36 in the cathode circuit. When the voltage at the upper terminal of capacitor 31 has dropped to −115 volts, diode 37 begins to conduct, and thus holds the voltage at the top of capacitor 31 to a predetermined lower reference level. Inductor 29 and resistor 30 in the thyratron anode circuit provide an inductive "kick" to insure that capacitor 31 is fully discharged to the voltage level maintained by diode 37.

Once the tube stops conducting, it appears as a high impedance across capacitor 31, at which time the capacitor begins to recharge at a substantially linear rate through resistor 34 and amplitude potentiometer 33 toward a level of positive 250 volts at terminal 32. Control grid 28 resumes control and its grid voltage level once again determines the ionization potential of the thyratron, and consequently the start of the next capacitor discharge. Thus in effect, the grid voltage level on the thyratron controls only the ionization or breakdown potential of the tube and not the deionization potential; and further the grid bias is only effective in controlling the tube during the time when the gas in the tube is in the deionized state. In the preferred embodiment, the grid bias level is controlled by potentiometer 41 as will be described hereinafter, and the positive starting pulse is applied to control grid 28 via condenser 26 and resistor (49).

One problem generally associated with conventional sweep circuits is that the reference potential from which the sawtooth waveform begins to rise varies due to variation in circuit parameters, variations between tubes, aging of tubes and components, etc. Such variations normally result in the capacitor beginning its recharge cycle from different potential levels, thereby producing displaced sweeps and sweep jitter, which is particularly noticeable within the frequency range over which the present apparatus is designed to operate. To prevent this undesirable condition in the present apparatus, and thereby insure that condenser 31 will always begin to recharge from the same voltage level, an inductor 29, a resistor 30 and a diode connected triode 37 are utilized in the basic sawtooth generator circuit. Inductor 29 and resistor 30 in the anode circuit of thyratron 21 provide an inductive "kick" to insure that capacitor 31 will attempt to discharge below the voltage level of the anode of diode 37. The cathode of diode 37 will thereupon immediately conduct and thereby establish the base reference potential from which condenser 31 begins to recharge. By means of the above described circuit, parameter variations from firing to firing, such as variation in voltage drop across thyratron 21, are automatically compensated for.

The diode connected triode tube 38 functions as a clipping diode to prevent the thyratron output potential from rising above ground level when no input signal is present and thereby limits the maximum voltage to which capacitor 31 may charge. If the voltage output of the thyratron was permitted to rise above this level, it would cause the associated deflection amplifier to draw excessive current, resulting in possible damage to the deflection yoke.

The RC network comprising capacitor 31 and resistors 33 and 34 determines the basic sweep rate of the subject apparatus. Variable resistor 33 provides a linear adjustment of the basic sweep rate. Since this RC network determines the rate of rise of the sawtooth waveform, it thereby controls the voltage amplitude of the sawtooth wave. The upper end of capacitor 31 is connected through conductor 45 and parasitic suppressor 46 to control grid 47 of cathode follower circuit 22. Thus any voltage changes occurring across capacitor 31 are reflected in cathode 54 of cathode follower 22.

Potentiometer 41 together with resistors 42, 43 and 44 comprises the bias dividing network for thyratron 21. Potentiometer 41 provides adjustment of the reference potential at which capacitor 31 begins charging by controlling the potential at terminals 48 and 48A of the bias dividing network. Potentiometer 41 is adjusted to insure that the current through yoke 61 is just zero at the start of the sweep, and thereby functions as a centering control to insure that the radial sweep starts at the center of the display CRT.

Cathode follower stage 22 includes a voltage divider network comprising resistors 51, 52 and 53 in the cathode circuit to insure that the correct D.C. level is applied to screen grid 57 of deflection amplifier 23. These resistors also function as the cathode load resistors in addition to the voltage divider of the cathode circuit.

The output from cathode follower stage 22 is applied to screen grid 57 of the deflection amplifier 23 in order that a larger voltage swing can be applied to the deflection amplifier than could be inserted through the control grid 59. It is desirable to utilize a large output swing since the overall sweep circuit is D.C. coupled and thyratron 21 should always maintain a reasonable potential difference between its cathode and anode when an input pulse arrives. This relatively large voltage swing is applied to the screen grid 57 in order to control the current output in a linear manner. Since the signal applied to screen grid 57 of deflection amplifier 23 is the sawtooth waveform heretofore described, and the current output of deflection amplifier 23 is substantially linear with respect to the input, the current at anode 58 will also reflect the sawtooth waveform. As heretofore noted, there is a slight curvature in the output waveform of the deflection amplifier due to the screen grid characteristics which compensates for an opposite curvature resulting from the exponential charging of capacitor 31. Since deflection yoke 61 is directly connected to anode 58, the sawtooth waveform current will flow through the yoke. Since cathode 62 of deflection amplifier 23 is maintained at −150 volts through resistor 63 while the control grid 59 is connected through resistor 64 to ground, control grid 59 maintains a potential slightly positive with respect to the cathode and a slight amount of grid curent is drawn. However, the grid current drawn by control grid 59 is limited to a negligible flow by resistor 64, so that control grid 65 will be maintained at substantially the same potential as cathode 62, thereby compensating for the contact potential between cathode 62 and control grid 59 within the deflection amplifier tube. Resistor 63 in the cathode circuit of the deflection amplifier functions as a degenerative element to compensate for parameter variations in the deflection amplifier tube, and to permit the tube to function properly with a large signal swing applied to the screen grid. Cathode degeneration and the screen grid characteristics compensate for any non-linearity in the driving voltage to effect a more linear output through the yoke 61. Resistor 67 is shunted across yoke 61 to damp out oscillations across the yoke when the current through the yoke falls rapidly. A fuse 68 in the anode circuit of the deflection amplifier functions as a yoke current overload protector. The particular voltage levels employed in the present circuit permit one side of yoke 61 to be connected to ground, thereby providing a safety feature in operation and maintenance of the circuit. In a particular embodiment, yoke 61 shown schematically in Fig. 2, has a D.C. resistance of approximately 400 ohms and an inductance of approximately 260 millihenries.

In the preceding description, it was noted that the time required for flyback of the sweep generator is extremely short with respect to the duration of the sawtooth waveform. This is a distinct advantage for sweep circuits in that no special flyback blanking provisions are required. In the preferred embodiment herein described, the short flyback time allows the input pulse to reset the sawtooth generator as well as initiate a new sweep. This exceedingly short flyback time compared with the sweep length make it unnecessary to provide the auxiliary circuitry ordinarily required to provide reset and blanking signals prior to the arrival of the next input pulse which initiates a new sweep.

A further feature associated with the present circuit is the provision that the beam of the associated cathode ray tube is normally maintained at the outer edge of the display. The beam may be so positioned that it is at or slightly beyond the outer edge of the display when waiting for an input signal to start the sweep, thereby preventing possible damage to the phosphorescent screen. By this provision the beam need not be blanked, since it remains deflected beyond the outer edge of the CRT screen. Prior to initiating a sweep, therefore, maximum curent is generated by deflection amplifier 23 and applied to the yoke. Upon application of the input pulse, the flyback is generated, causing the beam to go substantially instantaneously to the center of the display, from where it sweeps toward the outer edge of the display as heretofore described. Thus each cycle of the sawtooth generator is terminated at the upper limit of the sawtooth waveform, where it remains until receipt of the succeeding input pulse.

Referring now to Figs. 3*a* and 3*b*, there is illustrated an idealized representation of the output waveforms of the present apparatus. It is to be understood that these waveforms do not represent the actual quantitative values of the voltage, but they do represent in a general way, the qualitative variations of the voltage with time.

Referring specifically to Fig. 3*a*, there is illustrated an idealized representation of the signal generated at the anode of the thyratron sawtooth generator 21. As heretofore described, each sawtooth cycle is initiated at the upper level of the sawtooth waveform shown as point 71. From this it is apparent that an appreciable potential exists on the anode of the thyratron in the absence of an input signal. Points 71 and **71*a*** in the succeeding waveform indicate the striking potential of the thyratron anode when the grid is positively pulsed by an incoming signal.

When an input signal is received at the control grid of the thyratron, the thyratron fires, capacitor 31 (Fig. 2) discharges and the thyratron anode potential drops rapidly along the perpendicular line labeled flyback to point 72. Point 72 indicates the anode potential at which the current through the thyratron is reduced to zero, i.e., the deionization level of the thyratron. The time required for the thyratron anode to fall from point 71 to point 72 on the curve is the flyback time. When the anode reaches point 72, it starts to rise immediately along a slope labeled trace to point **71*a*. The time required for the thyratron anode to travel from point 72 to point 71*a*** comprises one cycle of the sawtooth waveform. The exponential rise of the slope is exaggerated for ease of illustration.

Referring now to Fig. 3*b*, there is illustrated two successive output waveforms of deflection amplifier 23. The point labeled 73 corresponds in time to the point 71 in Fig. 3*a*, while the dotted line labeled "input signal to deflection amplifier" corresponds to the exaggerated exponential rise shown in Fig. 3*a* and labeled "trace." The dotted line labeled "screen grid characteristics of deflection amplifier" illustrates that the non-linear characteristics of the deflection amplifier are substantially opposite and compensate for the characteristics of the input signal. As a result, the output signal labeled "resultant current waveform" is a sawtooth current signal having a substantially linear slope and rapid flyback.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit adapted to produce a sawtooth signal to deflect the yoke of a magnetically deflected cathode ray tube comprising a thyratron sawtooth generator circuit adapted to generate a sawtooth potential having trace and flyback components, said generator circuit including a capacitor having an associated charge circuit, a discharge circuit including said thyratron for discharging said capacitor in response to an input signal, said discharge producing the flyback component in the output signal of said sawtooth generator, and means to establish a fixed potential level from which said capacitor begins to recharge.

2. A sweep circuit adapted to generate a substantially linear sawtooth current signal in response to an initiating pulse for driving the deflection coil of a cathode ray tube to obtain a radial sweep comprising in combination a thyratron sawtooth generator circuit for generating a sawtooth potential, said circuit including a capacitor having an associated charge circuit, means for initiating conduction in said thyratron in response to an input pulse, a discharge circuit responsive to said conduction for discharging said capacitor, said discharge being reflected as the flyback portion of said sawtooth potential, said discharge circuit including an inductance to insure complete discharge of said capacitor, means for providing a lower reference potential for said sawtooth potential, means for limiting the upper level of said sawtooth potential, a power amplifier having at least a cathode, a control grid, a screen grid, and an anode, a cathode degeneration circuit in said power amplifier for maintaining said control grid and said cathode at substantially the same bias level during conduction and a cathode follower circuit for coupling said sawtooth generator to the screen grid of said power amplifier whereby the screen grid characteristics of said amplifier together with said cathode degeneration circuit function to compensate for the exponential characteristics of sawtooth potential.

3. A sawtooth generator circuit comprising in combination a thyratron sawtooth generator circuit including a capacitor having an associated charge and discharge circuit, means for initiating conduction in said thyratron in response to an input pulse, said conduction functioning to discharge said capacitor through said thyratron and thereby generate the flyback portion of said sawtooth signal, means for establishing a constant reference potential from which said capacitor charges, and means for ensuring complete discharge of said capacitor to said reference potential.

4. A device of the character claimed in claim 3 wherein said means for establishing a constant reference potential comprises a unidirectional conduction device interconnected between said capacitor and a source of reference potential.

5. A device of the character claimed in claim 3 wherein said means for ensuring complete discharge of said capacitor to said reference potential comprises an inductance interconnected between the anode of said thyratron and said capacitor.

6. A sweep circuit adapted to generate a substantially linear sawtooth current signal in response to an initiating pulse for driving the deflection coils of a cathode-ray tube comprising in combination a thyratron sawtooth generator circuit for generating a sawtooth potential, said circuit including a capacitor having an associated charge and discharge circuit, means responsive to said initiating pulse for discharging said capacitor through said thyratron to generate the flyback portion of said sawtooth potential, means for establishing a reference potential for said sawtooth signal, means to insure a complete discharge of said capacitor to said reference potential, and means for converting said sawtooth potential to a sawtooth current wave, said conversion means functioning to compensate for the exponential characteristics of said sawtooth potential to thereby provide a substantially linear sawtooth current waveform.

7. A device of the character claimed in claim 6 wherein said means for compensating for the exponential characteristics of said sawtooth potential includes the screen grid characteristics of a power amplifier circuit in said conversion means.

References Cited in the file of this patent

UNITED STATES PATENTS

| | | |
|---|---|---|
| 2,098,052 | Lord | Nov. 2, 1937 |
| 2,102,371 | Miller | Dec. 14, 1937 |
| 2,364,998 | Palmer et al. | Dec. 12, 1944 |
| 2,508,879 | Zagor | May 23, 1950 |
| 2,654,855 | Denton | Oct. 6, 1953 |
| 2,688,075 | Palmer | Aug. 31, 1954 |
| 2,715,182 | Bishop | Aug. 9, 1955 |
| 2,810,093 | Deal | Oct. 15, 1957 |

FOREIGN PATENTS

| | | |
|---|---|---|
| 134,712 | Australia | Oct. 18, 1949 |
| 711,170 | Great Britain | June 24, 1954 |